US012809690B2

(12) United States Patent
Brown et al.

(10) Patent No.: US 12,809,690 B2
(45) Date of Patent: Nov. 24, 2026

(54) COMPUTE TARGETS FOR DATA SCIENCE WORKLOAD EXECUTION AND IDENTITY AND ACCESS MANAGEMENT INTEGRATION

(71) Applicant: Oracle International Corporation, Redwood Shores, CA (US)

(72) Inventors: Jeremy Allen Brown, Seattle, WA (US); Jason Anthony Slepicka, Long Beach, CA (US); Lyudmil Valentinov Pelov, Hamburg (DE); Saurabh Jain, Bothell, WA (US); Abhinav Gupta, Woodinville, WA (US)

(73) Assignee: Oracle International Corporation, Redwood Shores, CA (US)

( * ) Notice: Subject to any disclaimer, the term of this patent is extended or adjusted under 35 U.S.C. 154(b) by 435 days.

(21) Appl. No.: 18/519,807

(22) Filed: Nov. 27, 2023

(65) Prior Publication Data

US 2025/0094238 A1 Mar. 20, 2025

Related U.S. Application Data

(60) Provisional application No. 63/583,287, filed on Sep. 17, 2023.

(51) Int. Cl.
*G06F 9/50* (2006.01)

(52) U.S. Cl.
CPC .......... *G06F 9/5077* (2013.01); *G06F 9/5072* (2013.01)

(58) Field of Classification Search
CPC ............................. G06F 9/5077; G06F 9/5072
See application file for complete search history.

(56) References Cited

U.S. PATENT DOCUMENTS

| | | | | |
|---|---|---|---|---|
| 10,298,515 | B1 * | 5/2019 | Kirchhofer | H04L 47/783 |
| 11,513,864 | B2 | 11/2022 | Koppes et al. | |
| 2009/0300607 | A1 * | 12/2009 | Ferris | G06F 9/45558 718/1 |
| 2011/0265164 | A1 * | 10/2011 | Lucovsky | G06F 9/45533 718/1 |
| 2019/0108575 | A1 | 4/2019 | Gupta et al. | |
| 2021/0224091 | A1 * | 7/2021 | Hayatnagarkar | G06F 9/45558 |
| 2022/0060490 | A1 * | 2/2022 | Farshteindiker | G06F 21/552 |
| 2023/0244505 | A1 | 8/2023 | Hernandez Serrano et al. | |
| 2023/0418966 | A1 * | 12/2023 | Pandey | G06F 9/4881 |

* cited by examiner

*Primary Examiner* — Wissam Rashid
(74) *Attorney, Agent, or Firm* — Invoke

(57) ABSTRACT

A system receives a configuration request comprising an infrastructure definition that defines a set of resources, to be selected from a set of tenant-managed resources implemented on a tenant's premises, for implementing the compute target entity. The system generates a compute target entity associated with an addressable identifier. The compute target entity corresponds to the set of resources selected from the set of tenant-managed resources. The system receives an execution request for execution of a set of operations, where the execution request specifies the addressable identifier associated with the compute target entity for execution of the set of operations. The system maps the addressable identifier of the compute target entity to the set of resources. The system causes execution of the set of operations on the set of resources on the tenant's premises via the compute target entity.

21 Claims, 9 Drawing Sheets

COMPUTE TARGETS FOR DATA SCIENCE WORKLOAD EXECUTION AND IDENTITY AND ACCESS MANAGEMENT INTEGRATION

INCORPORATION BY REFERENCE; DISCLAIMER

The following application is hereby incorporated by reference: Application 63/583,287, filed on Sep. 17, 2023. The Applicant hereby rescinds any disclaimer of claims scope in the parent application(s) or the prosecution history thereof and advises the USPTO that the claims in this application may be broader than any claim in the parent application(s).

TECHNICAL FIELD

The present disclosure relates to executing service provider applications on tenant-controlled infrastructure. In particular, the present disclosure relates to creating a compute target entity having credentials that permit the compute target entity to access a set of tenant-managed resources on behalf of a service provider application.

BACKGROUND

Cloud service providers can offer data services for performing computationally intensive and/or computationally complex operations using the cloud service's own applications. Data services can include, for example, machine learning operations, artificial intelligence operations, simulations of complex systems, scientific and engineering operations, and the like. A data service system typically uses compute infrastructure owned and controlled by the cloud service. If resources within the infrastructure are in use, the data service may not be able to fulfill a customer's requested work at the requested time.

Some cloud service tenants own and control their own infrastructure. Such tenants may prefer to use the infrastructure they control for data security reasons and/or because their own infrastructure is generally always available for use when needed. However, a data service operated by a cloud service provider does not have access to the infrastructure controlled by a tenant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
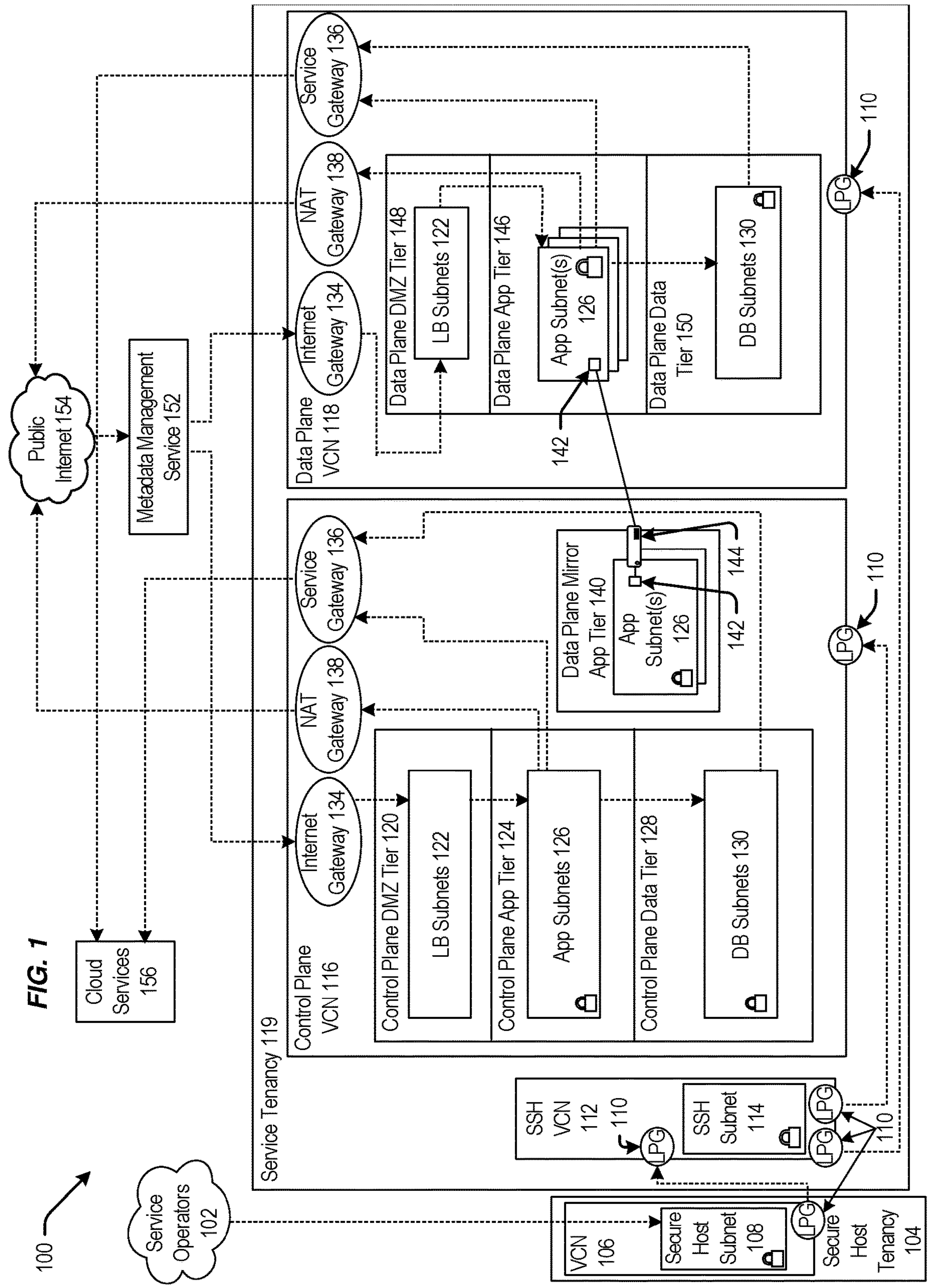
FIG. 1 is a block diagram illustrating one pattern for implementing a cloud infrastructure as a service system, according to at least one embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

1. GENERAL OVERVIEW
2. INFRASTRUCTURE AS A SERVICE
3. SERVICE PROVIDER ARCHITECTURE
4. EXECUTING SERVICE PROVIDER APPLICATIONS ON TENANT-CONTROLLED INFRASTRUCTURE
5. EXAMPLE EMBODIMENT
6. PRACTICAL APPLICATIONS, ADVANTAGES, AND IMPROVEMENTS
7. MISCELLANEOUS; EXTENSIONS

1. General Overview

One or more embodiments implement a Graphical User Interface (GUI) that enables a tenant to execute operations using a service provider's application(s) and a set of tenant-managed resources located on the tenant's premises. A service provider system displays the GUI to enable a tenant to select, configure, and utilize the set of tenant-managed resources located on the tenant's premises.

Initially, the GUI, presented by the service provider system, receives a create request to create a compute target entity as an abstraction layer for managing a set of resources selected from the set of tenant-managed resources located on the tenant's premises. The create request includes an infrastructure definition that defines the set of resources of the set of tenant-managed resources. The defined set of resources include (a) a set of physical infrastructure resources (e.g., GPUs) on the tenant's premises and/or a (b) set of virtual resources executing on the set of physical infrastructure resources on the tenant's premises. The virtual resources may include, for example, compute, storage, and network resources.

The service provider system generates the compute target entity as an addressable entity with an addressable identifier corresponding to the set of resources. The compute target entity is generated with its own set of credentials for accessing one or more of the tenant-managed resources. The compute target entity may further be assigned a role, of a set of roles, with a corresponding set of permissions. The compute target entity may be permitted to access one or more namespaces of a set of namespaces implemented across the tenant-managed resources. The set of resources mapped to the compute target entity include resources that are permitted by the role assigned to the compute target entity, the credentials corresponding to the compute target entity, and the namespace(s) accessible to the compute target entity.

The service provider system receives, from a tenant via the GUI, an execution request to execute a set of operations. The execution request specifies the previously defined and created target compute entity. In response to receiving the execution request, the service provider system executes an application for completing the requested operations. The application generates a set of commands that, when executed, complete the requested operations. In association with the compute target entity, the service provider system transmits the set of commands to a tenant resource manager associated with the set of tenant-managed resources. The set of commands are transmitted for execution on the set of resources associated with the compute target entity. The tenant resource manager evaluates the permissions and restrictions associated with the compute target entity to verify that the compute target entity is permitted to execute commands on the set of resources. In response to determining that the compute target entity is permitted to execute commands on the set of resources, the tenant resource manager initiates execution of the received set of commands using the set of resources.

One or more embodiments described in this Specification and/or recited in the claims may not be included in this General Overview section.

2. Infrastructure as a Service

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy age 5 middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram 100 illustrating an example pattern of an IaaS architecture, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of: the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
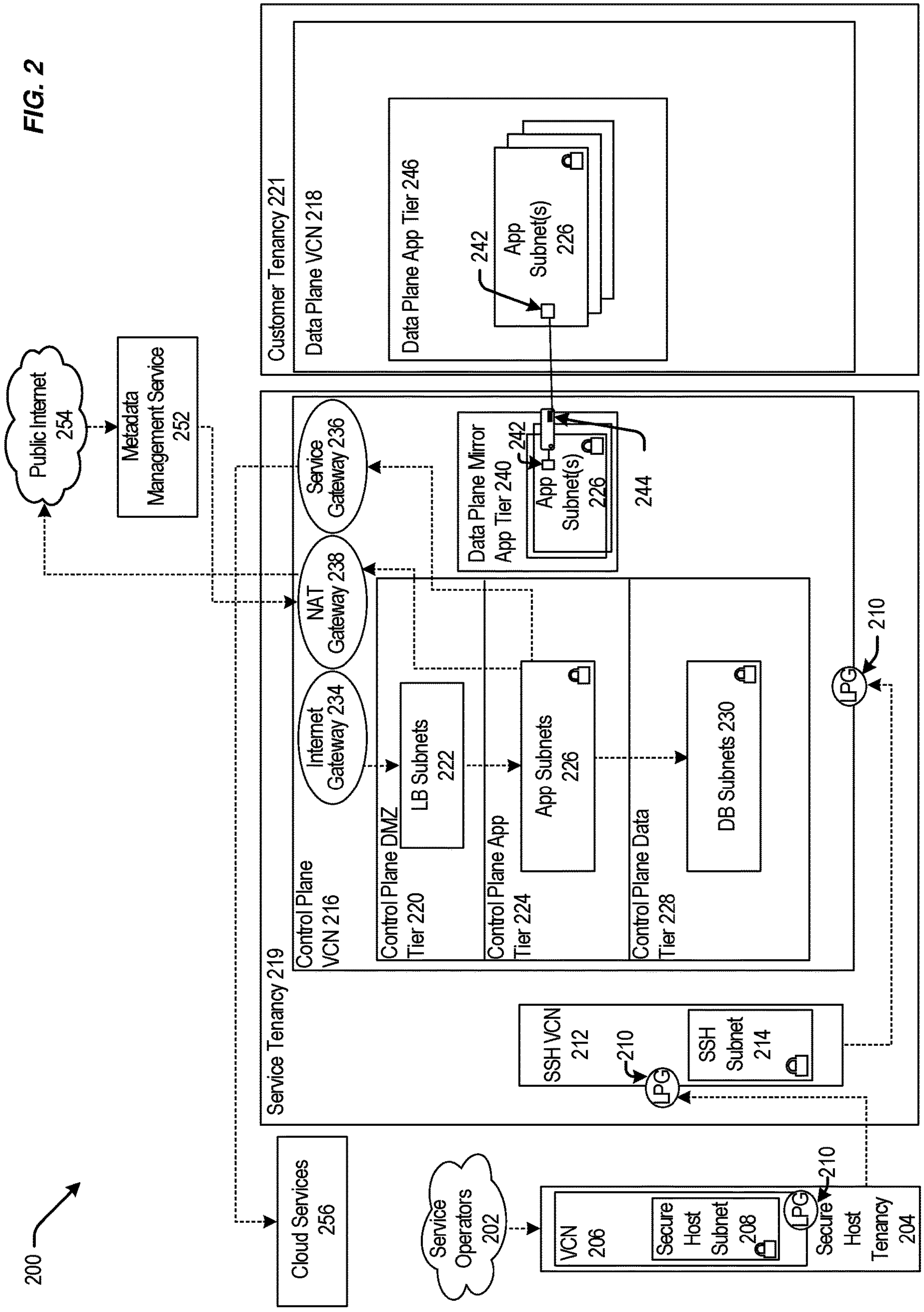
FIG. 2 is a block diagram illustrating another pattern for implementing a cloud infrastructure as a service system, according to at least one embodiment.

FIG. 2 is a block diagram 200 illustrating another example pattern of an IaaS architecture, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
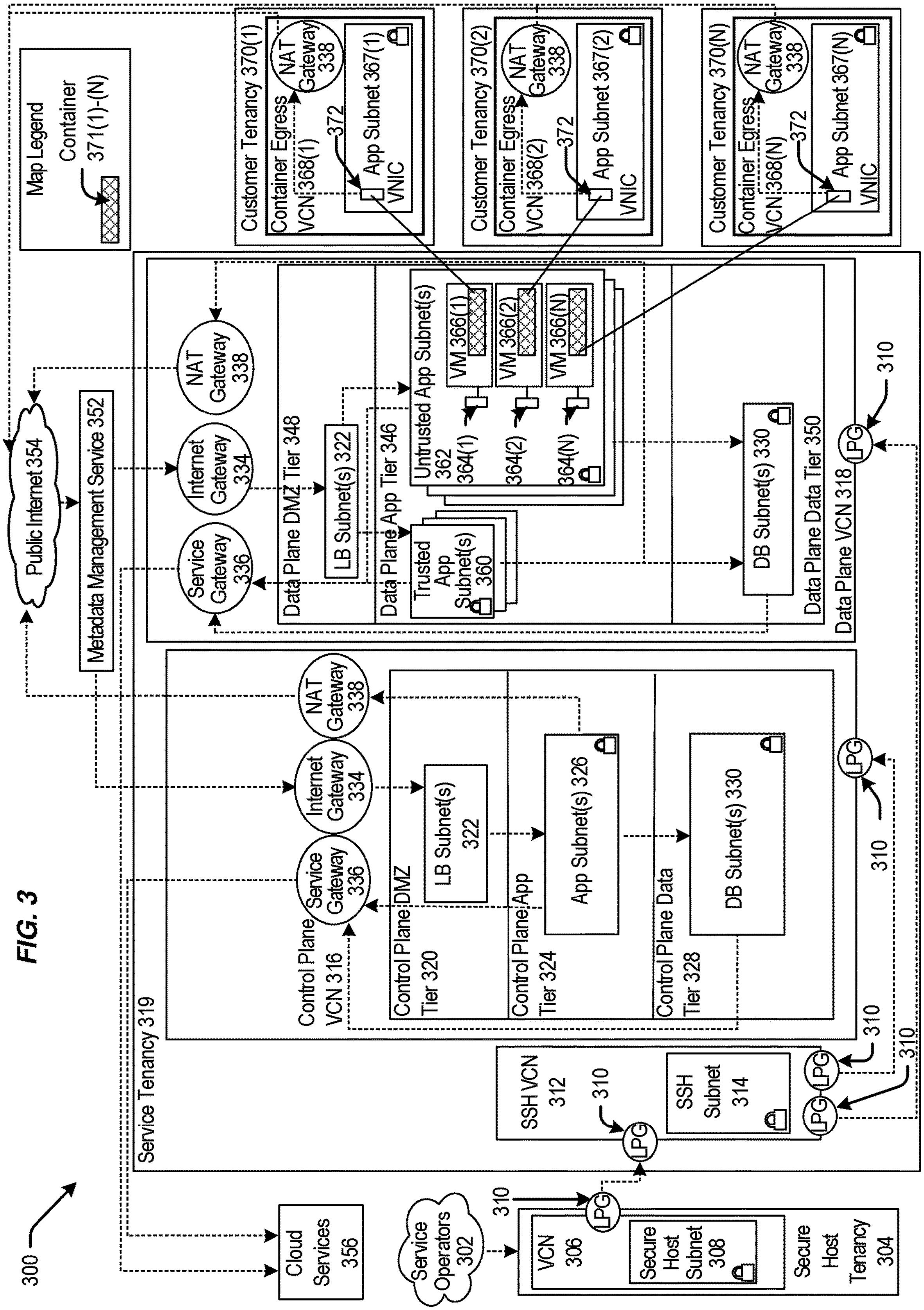
FIG. 3 is a block diagram illustrating another pattern for implementing a cloud infrastructure as a service system, according to at least one embodiment.

FIG. 3 is a block diagram 300 illustrating another example pattern of an IaaS architecture, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 370(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management system 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 370. Respective containers 371(1)-(N) contained in the VMs 366(1)-(N) may be configured to run the code. In this case, there can be a dual isolation (e.g., the containers 371(1)-(N) running code, where the containers 371(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 371(1)-(N) may be communicatively coupled to the customer tenancy 370 and may be configured to transmit or receive data from the customer tenancy 370. The containers 371(1)-(N) may not be configured to transmit or receive data from any other entity in the data plane VCN 318. Upon completion of running the code, the IaaS provider may kill or otherwise dispose of the containers 371(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 371(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
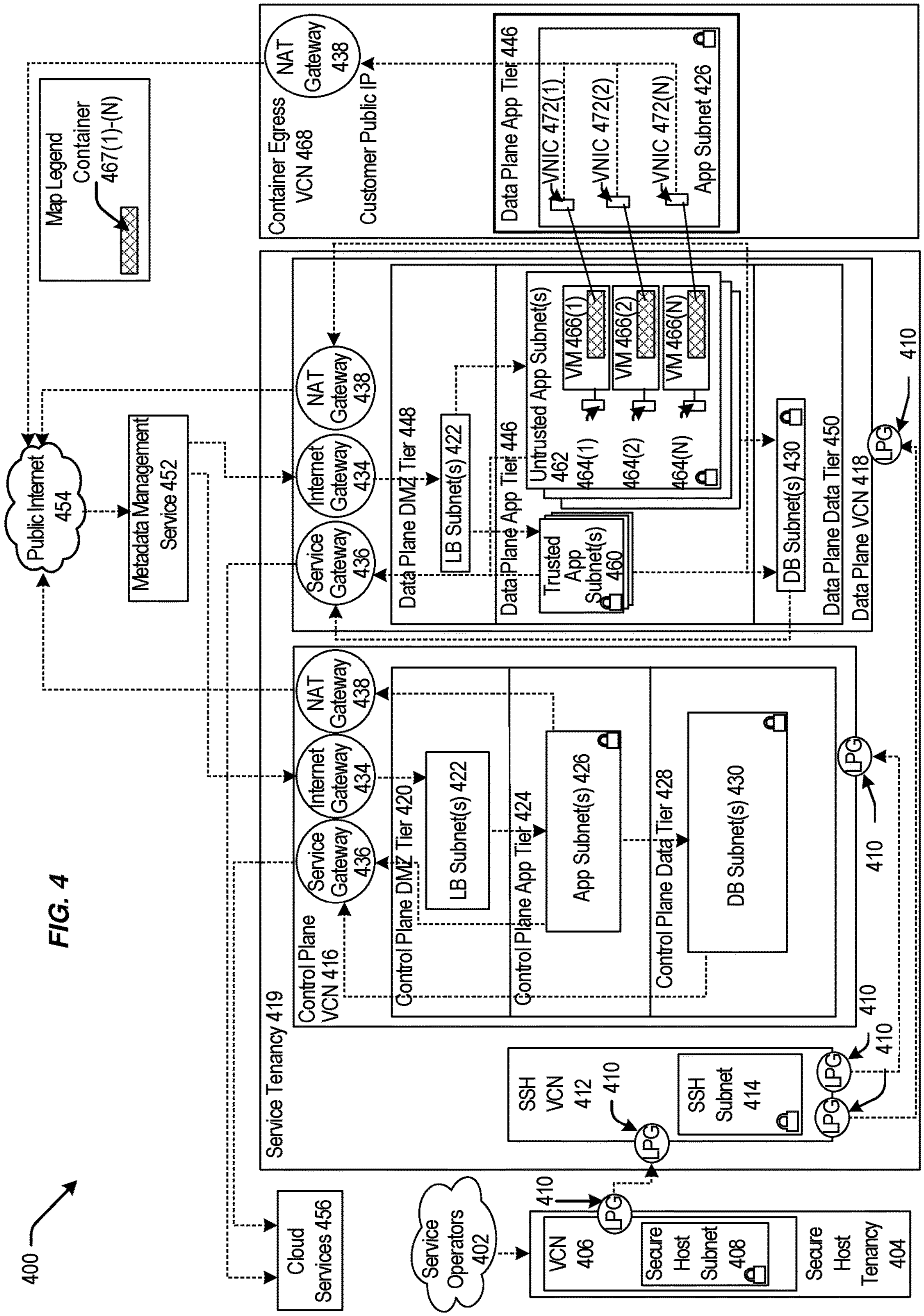
FIG. 4 is a block diagram illustrating another pattern for implementing a cloud infrastructure as a service system, according to at least one embodiment.

FIG. 4 is a block diagram 400 illustrating another example pattern of an IaaS architecture, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management system 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 5:
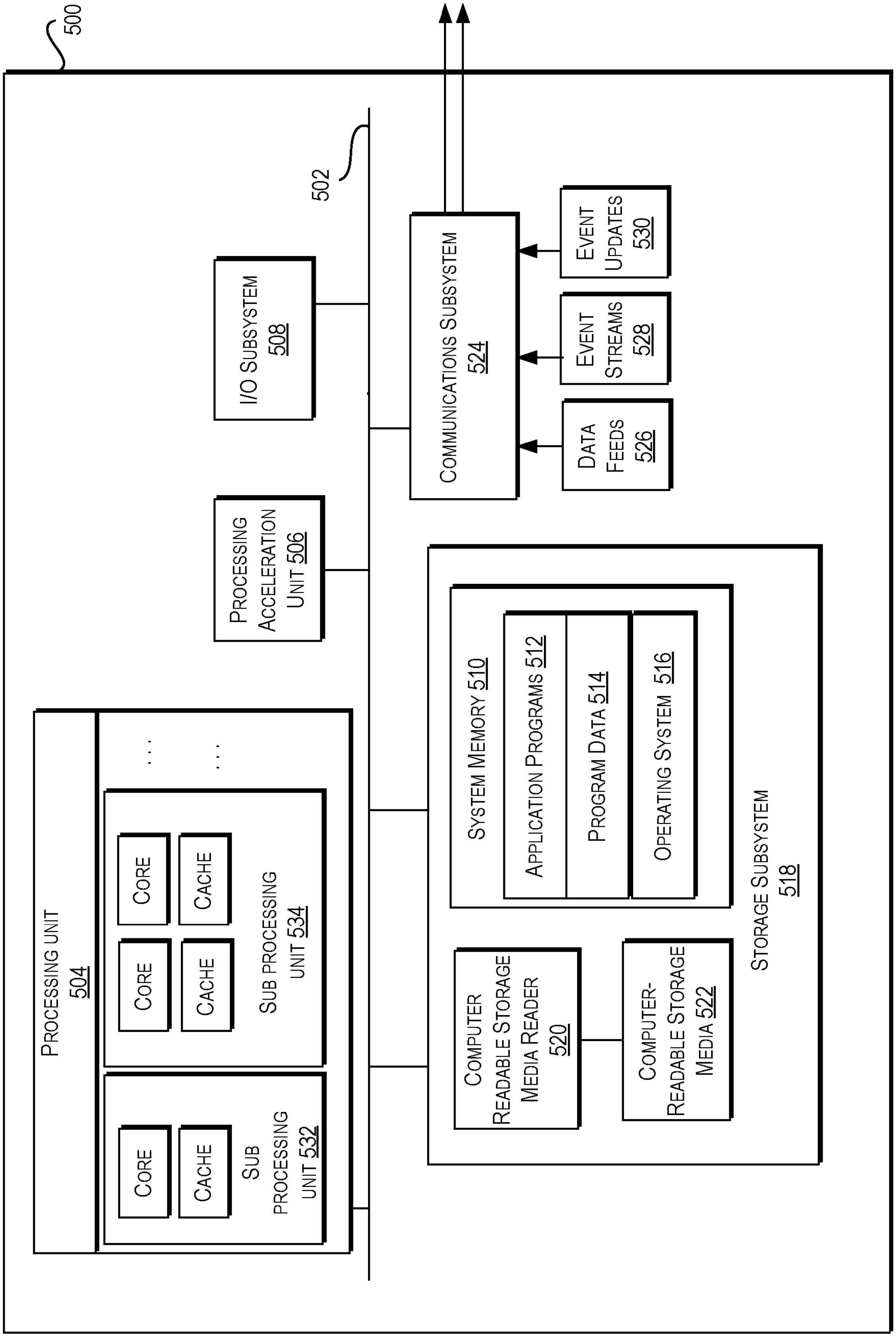
FIG. 5 is a block diagram illustrating an example computer system, according to at least one embodiment.

FIG. 5 illustrates an example computer system 500, in which various embodiments may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processor(s) 504 and/or in storage subsystem 518. Through suitable programming, processor(s) 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions that are loadable and executable by processing unit 504. System memory 510 may also store data that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

3. Service Provider Architecture

Figure 6:
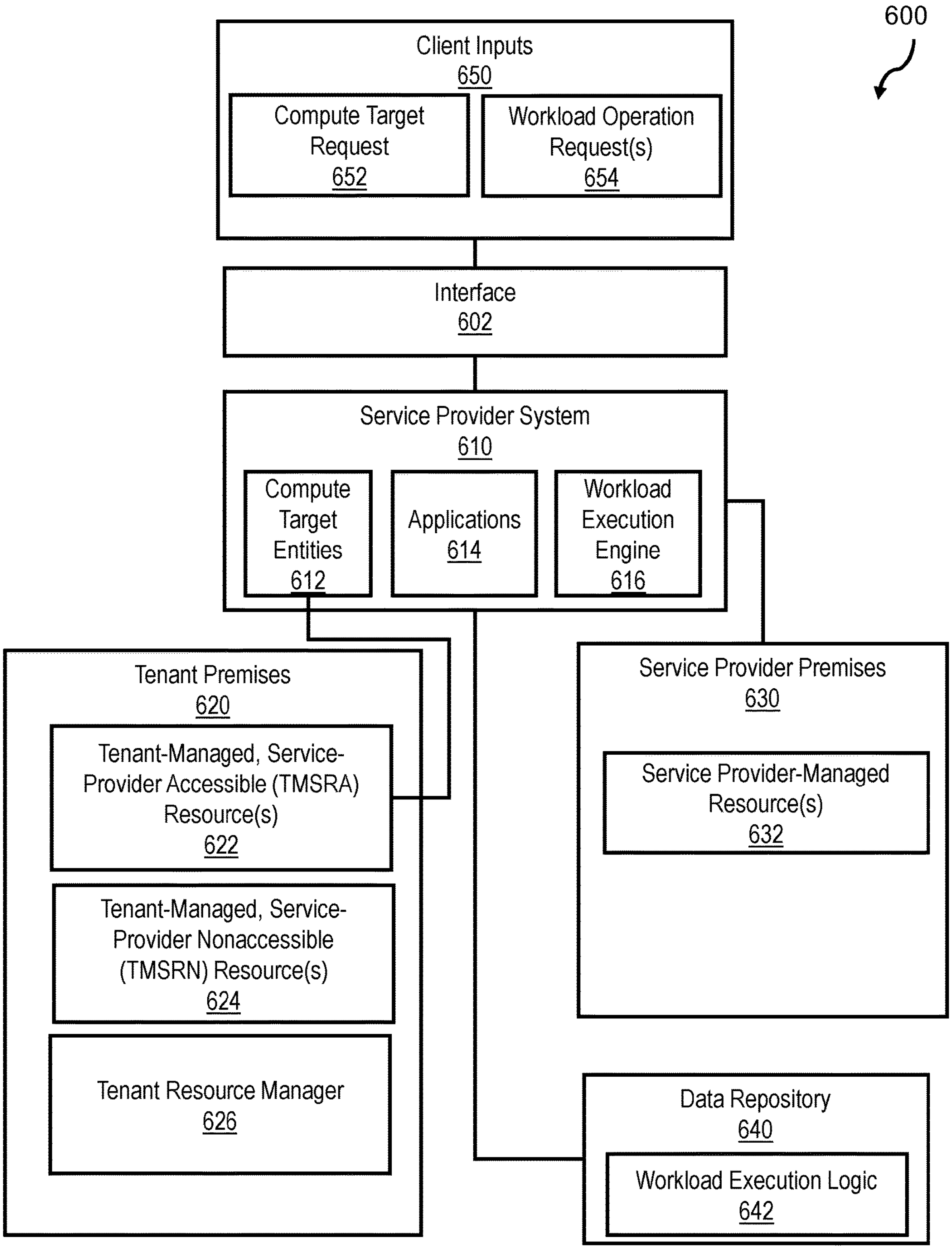
FIG. 6 illustrates a system in accordance with one or more embodiments.

FIG. 6 illustrates a system 600 in accordance with one or more embodiments. This system 600 includes an interface 602, a service provider system 610, tenant premises 620, service provider premises 630, and a data repository 640. The system 600 receives client inputs 650. In one or more embodiments, the system 600 may include more or fewer components than the components illustrated in FIG. 6. The components illustrated in FIG. 6 may be local to or remote from each other and they may be implemented in software and/or hardware. Each component may be distributed over multiple applications and/or machines. Multiple components may be combined into one application and/or machine. Operations described with respect to one component may instead be performed by another component.

The service provider system 610 may represent one or more aspects of the services offered by a cloud service provider. A cloud service provider offers on-demand, scalable computing services to its customers. This relieves the customer from having to invest in, maintain, and update potentially expensive computing resources. The computing services can include data storage services, large-scale computing power services, and applications provided over a network. The cloud service provider may own large quantities of computing resources, such as processors, data storage devices, network devices, and the connections among the computing resources to operate the resources and make the resources available to the customers. An example of cloud service applications includes data services that perform computationally intensive and/or computationally complex operations. Data services can include, for example, machine learning operations, artificial intelligence operations, simulations of complex systems, scientific and engineering operations, and the like.

In one or more embodiments, the service provider system 610 refers to hardware and/or software configured to perform operations described herein for causing execution of applications 614 responsive to receiving a workload operation request 654. Examples of operations for causing execution of service provider applications on tenant-controlled infrastructure are described below with reference to FIG. 7.

Tenant premises 620 refers to one or more locations housing a set of physical computing resources that are owned by a tenant. The tenant premises 620 may be a physical space where the physical computing resources are housed. The tenant premises 620 may be a logical grouping of physical resources that are housed in multiple physical spaces. The computing resources may include for example, processors, storage devices, volatile memory, and network components. In one or more embodiments, a tenant is a corporation, organization, enterprise or other entity that uses the service provider system 610 and controls the tenant premises 620.

In one or more embodiments, the tenant premises 620 include Tenant-Managed, Service-Provider Accessible (TMSRA) Resource(s) 622. The TMSRA 622 can include a set of physical resources that are made accessible to the service provider system 610 via a compute target entity 612. In one or more embodiments, the tenant premises 620 include Tenant-Managed, Service-Provider Non-accessible (TMSRN) Resource(s) 624. The TMSRN 624 can include a different set of physical resources that are not accessible to the service provider system 610. The TMSRN 624 may only be accessible to applications and resources within the tenant premises 620. In one or more embodiments, the tenant premises 620 include a tenant resource manager 626. The tenant resource manager 626 may evaluate and enforce the permissions and restrictions associated with any entity attempting to access the tenant-managed resources. When the entity has valid permission, the tenant resource manager may initiate execution of instructions received from the entity using the set of resources. The tenant resource manager 626 may also monitor the status of the execution of instructions and may communicate the status to the entity.

Service provider premises 630 refers to one or more locations housing a set of service provider-managed resources 632. The service provider-managed resources 632 may include physical computing resources and logic that are owned and controlled by the cloud service provider. The service provider-managed resources 632 can be accessed directly by the service provider system 610.

The service provider system 610 may include one or more functional components, such as applications 614 and a workload execution engine 616. The service provider system 610 may also generate and store compute target entities 612. Applications 614 may include hardware and/or software configured to perform operations for the data services provided by the service. Applications 614 may include, for example, machine learning applications, artificial intelligence applications, simulation applications, data analysis applications, and so forth.

The workload execution engine 616 may receive a workload operation request 654 from a data service customer (referred to herein as a client). The workload operation request 654 may include data, input parameters, resource specifications, and other information needed to use an application 614. The workload execution engine 616 may identify the application 614 needed to execute the workload request and may identify which resources are needed to execute the workload operation. The workload execution engine 616 may initiate the execution of the workload using workload execution logic 642 on the identified resources and may monitor the execution for completion, errors, and other status indicators.

In some instances, a workload operation request 654 may indicate that the workload operation should be executed by the service provider-managed resource 632. In other instances, a workload operation request 654 may indicate that the workload should be executed on a TMSRA resource 622. In the latter instance, the workload request 654 can include an identifier for a compute target entity 612.

A compute target entity 612 represents an addressable entity that is configured to communicate with a TMSRA resource 622 on behalf of the workload execution engine 616. A compute target entity 612 may be created when a compute target request 652 is received. The compute target request 652 can include an infrastructure definition that defines the set of resources of the set of TMSRA resources 622 that the compute target entity will be permitted to access. The infrastructure definition may also include an identifier of a cluster of resources and/or an identifier of a region of a cluster of resources. A cluster of resources may be a physical grouping of resources that are communicatively coupled or a logical grouping of resources that are communicatively coupled. The compute target entity 612 may be a file, a database entry, an object, an executable file, an application program interface (API), or any other data structure that can store or reference the infrastructure definition and other settings from the creation request and that can pass data and instructions to an application or other logical entity.

Once created, a compute target entity 612 has an addressable identifier corresponding to the set of resources in the infrastructure definition in the compute target request 652. The compute target entity 612 is generated with its own set of credentials for accessing one or more of the TMSRA resources. The compute target entity 612 may include one or more permissions to access the TMSRA resources. The permissions can include a role, of a set of roles, with a corresponding set of permissions. The permissions can include one or more namespaces of a set of namespaces implemented across the TMSRA resources. The set of resources mapped to the compute target entity may include resources that are permitted by the role assigned to the compute target entity, the credentials corresponding to the compute target entity, and/or the namespace(s) accessible to the compute target entity. The compute target entity may be assigned access privileges based on the least privilege principle, i.e., the minimum level of access required to allow an application using the compute target entity to execute operations on the set of resources.

A resource within the TMSRN 624 may become a service-provider accessible resource 622 if a compute target request includes the TMSRN 624 in an infrastructure definition in the compute target request. The tenant resource manager 626 may determine whether a compute target entity may access a TMSRA resource according to the permissions associated with the compute target entity.

A single tenant entity may use multiple different compute target entities. For example, within a single corporate entity, different departments may have respective compute target entities that grant access to different tenant resources for each department. In this case, the different compute target entities may be associated with respective different roles and/or with different namespaces. In another example, a corporate entity may serve multiple client entities and may use a different compute target for each different client entity.

In an embodiment, the system 600 is implemented on one or more digital devices. The term “digital device” generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a data repository 640 is any type of storage unit and/or device (e.g., a file system, database, collection of tables, or any other storage mechanism) for storing data. Further, a data repository 640 may include multiple different storage units and/or devices. The multiple different storage units and/or devices may or may not be of the same type or located at the same physical site. Further, a data repository 640 may be implemented or executed on the same computing system as the service provider system 610. Alternatively, or additionally, a data repository 640 may be implemented or executed on a computing system separate from the service provider system 610. The data repository 640 may be communicatively coupled to the service provider system 610 via a direct connection or via a network.

Information describing workload execution logic 642 may be implemented across any of components within the system 100. However, this information is illustrated within the data repository 640 for purposes of clarity and explanation.

In one or more embodiments, interface 602 refers to hardware and/or software configured to facilitate communications between a user and the service provider system 610. Interface 602 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 602 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 602 is specified in one or more other languages, such as Java, C, or C++.

Figure 7:
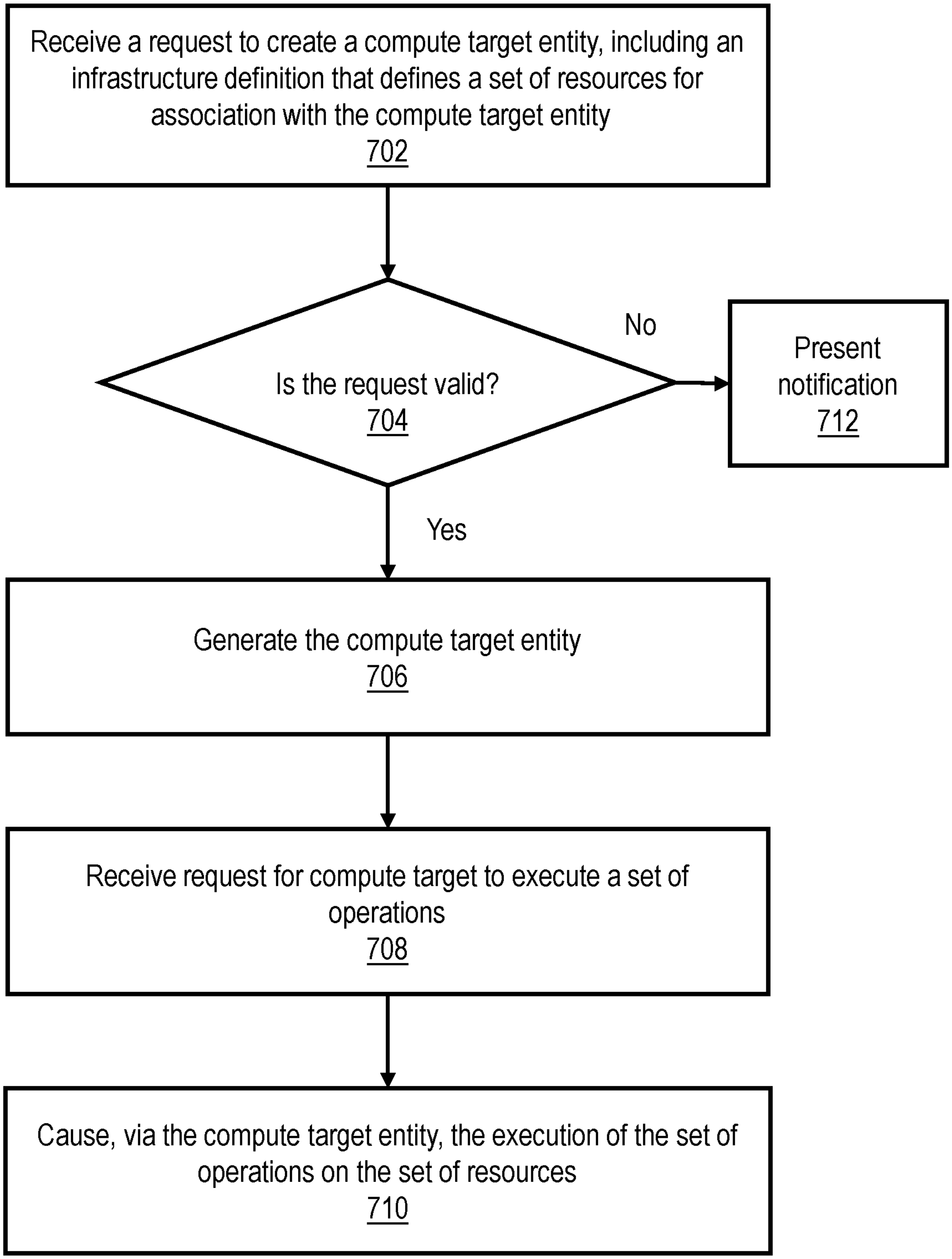
FIG. 7 illustrates an example set of operations for executing service provider applications on tenant-controlled infrastructure in accordance with one or more embodiments.

4. Executing Service Provider Applications on Tenant-Controlled Infrastructure FIG. 7 illustrates an example set of operations for causing execution of service provider applications on tenant-controlled infrastructure in accordance with one or more embodiments. One or more operations illustrated in FIG. 7 may be modified, rearranged, or omitted all together. Accordingly, the sequence of operations illustrated in FIG. 7 should not be construed as limiting the scope of one or more embodiments.

In one or more embodiments, the service provider system receivesa request to create a compute target entity via a graphical user interface (GUI) (Operation 702). The request to create a compute target entity may include an infrastructure definition that defines a set of resources for association with the compute target entity. The set of resources may include virtual and/or physical resources. The set of resources are for implementing the compute target entity. The set of resources are to be selected from a set of tenant-managed resources implemented on a tenant's premises. The request may also include one or more permission settings that define a level of access to the set of resources. The GUI may provide user interface elements that permit a user to select a set of resources from the tenant-managed resources. The GUI may provide user interface elements that permit a user to select roles, permissions, namespaces, or any other settings that are configured to enable access to the desired components of the tenant-controlled resources while preventing access to other parts of the tenant-managed resources. The GUI may further provide user interface elements that allow the user to name the requested compute target entity and include other information such as a description of the purpose of the compute target entity. The GUI may also provide a user interface element that allows the user to select from service provider-managed resources instead of, or in addition to, the tenant-managed resources.

In one or more embodiments, the service provider system checks whether the request is valid (Operation 704). For example, the system may determine if the resources specified in the request are available, and/or whether the resources are in the correct state for use. The system may determine whether the resources specified in the request are active. The system may determine whether physical resources are available for use and are accessible within the tenant's premises. The system may determine whether virtual resources, e.g., virtual machine (VMs), are spun up and active on hardware within the tenant's premises. The system may determine the entity requesting the generation of the compute target entity is authorized to setup a compute target entity corresponding to the specified set of resources.

In some cases, if the request is determined to be invalid, the service provider system may act on the resources to make the request valid. For example, the system may configure resources, e.g., by spinning up a virtual machine resource).

In one or more embodiments, if the request is not valid, the service provider system may present a notification corresponding to failure of the compute target entity (Operation 712). For example, the system may present a visual notification via the GUI indicating the failure. The notification may include details explaining the failure, such as that a resource was not found, a resource was not accessible, a resource state was invalid, or that the requesting entity is not authorized to access the resource.

In one or more embodiments, the service provider system generates a compute target entity (Operation 706). The service provider system may instantiate a compute target entity and generate a unique addressable identifier for the compute target entity. The system may also set up the resources for use and generate a unique identifier for the set of resources. The system may generate and store a mapping between the addressable identifier for the compute target entity and the identifier for the set of resources. The resource manager, executing on the tenant premises, may configure permissions and access rules for the compute target entity that restrict access to the set of resources associated with the compute target entity.

The system may transmit the addressable identifier of the newly generated compute target entity to the entity that generated the create request, for example, via the GUI. Once created, the compute target entity can be stored, retrieved by the addressable identifier, and reused to communicate with the set of resources associated with the addressable identifier.

In one or more embodiments, the system receives a request for execution of a set of operations by a compute target entity (Operation 708). The request may specify the addressable identifier associated with the compute target entity for execution of the set of operations. The request may include a selection of a service provider's particular application to execute the set of operations. The request may include a user-provided application to execute the set of operations. The request may further include data for input to the set of operations, for example, as files, or as a link to a data source. The request may include input parameters for the set of operations, command line instructions, time limits, and any other settings related to the execution of the set of operations. The request may be received from the same interface through which the compute target create request is received or through a different interface.

In one or more embodiments, the service provider system causes execution of the set of operations on the set of resources on the tenant's premises via the compute target entity (Operation 710). The service provider system maps the compute target entity to the corresponding set of resources. The system executes an application for completing the requested operations. The application generates a set of commands that, when executed, complete the requested set of operations. The service provider system transmits the set of commands, via the compute target entity, to the set of tenant-managed resources associated with the compute target entity for execution on the set of tenant-managed resources. In some embodiments, the service provider system may request execution of set of operations, via the compute target entity, using an Application Programming Interface (API) associated with the set of tenant-managed resources. The set of operations are then executed by the set of resources, and any resulting output may be stored within the tenant-managed resources, and/or transmitted, via the compute target entity, back to the service provider system. The service provider system may display information associated with the results, or job status information, to the requesting entity, for example, via the GUI.

In some embodiments, the service provider system transmits the commands to a tenant resource manager within the tenant premises via the compute target entity. The tenant resource manager evaluates the credentials associated with the compute target entity, e.g., permissions and restrictions, to verify that the compute target entity is permitted to execute commands on the set of resources. In response to determining that the compute target entity is permitted to execute commands on the set of resources, the tenant resource manager initiates execution of the received set of commands using the set of resources.

In one or more embodiments, a request to execute a set of operations may include more than one compute target entity. For example, some operations in the set of operations need to be performed on one set of resources or under one set of compute target credentials, while other operations in the set of operations need to be performed on a different set of resources or under a different set of credentials. The service provider system may cause the executions of the different sets of operations via the respective compute target entities from the request.

In one or more embodiments, a request to execute the set of operations may specify that some operations in the set of operations are to be performed via the compute target entity with the tenant-managed resources, while other operations in the set of operations are to be performed by the service-provider managed resources either via another compute target entity or without a compute target entity. The service provider system may accordingly cause the executions of the different sets of operations on the resources from the request.

5. Example Embodiment

Figure 8:
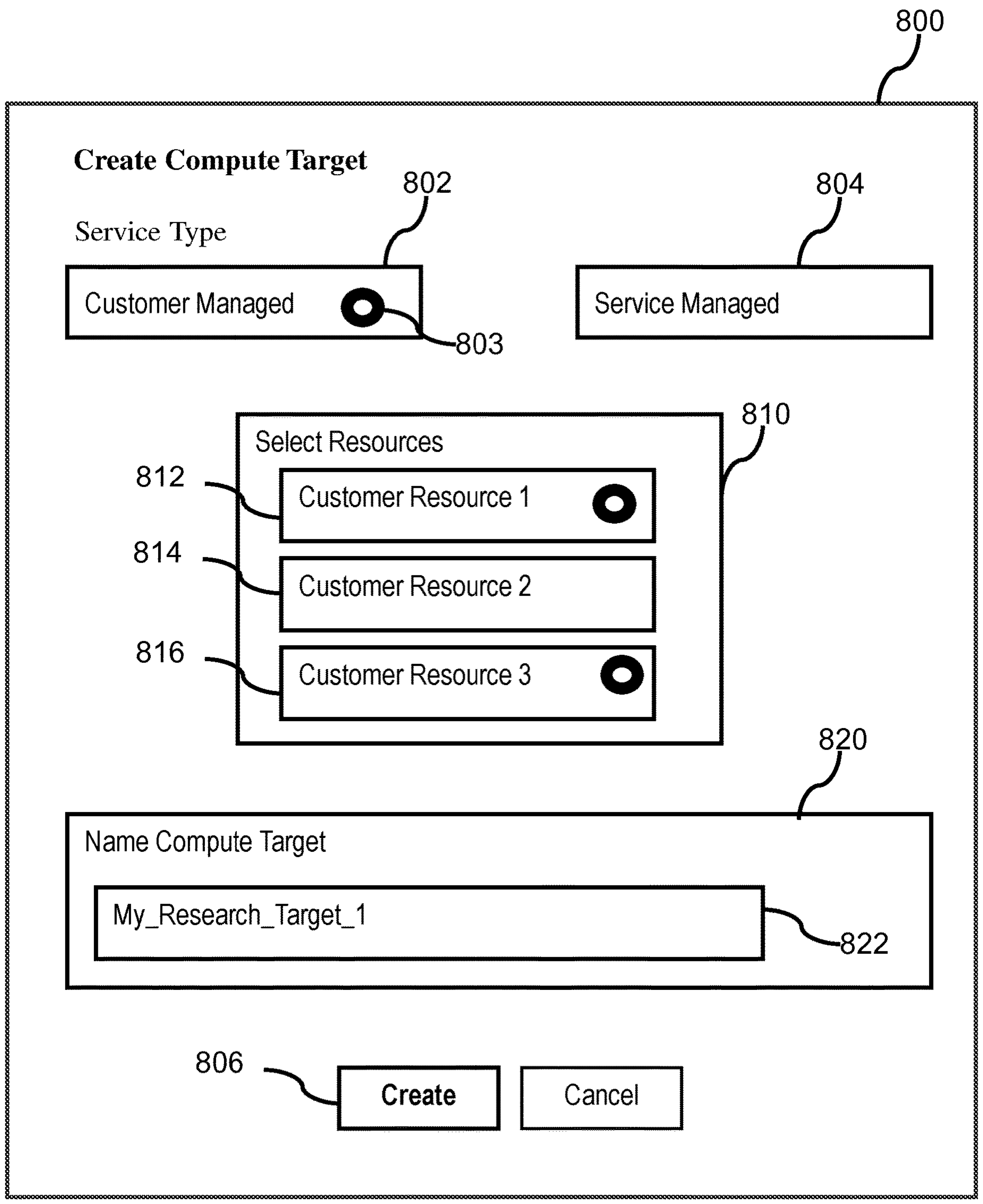
FIG. 8 illustrates an example of a graphical user interface in accordance with one or more embodiments.

FIG. 8 illustrates an example of a GUI 800 for creating a compute target. GUI 800 includes selectable elements that allow the user to select the service type for the compute target, e.g., element 802 for a customer managed compute target and element 804 for a service managed compute target. Element 803 indicates that the user has chosen to create a customer managed compute target.

GUI 800 may present a resource selection field 810 responsive to the user selecting the element 802. GUI 800 may present elements, e.g., 812, 814, and 816. An element may correspond to one tenant managed resource or a set of tenant managed resources that are available in the tenant premises for inclusion in a compute target. For example, element 812 allows the user to select "Customer Resource 1". In the illustrated example, elements 812 and 816 are selected, while element 814 is not selected.

GUI 800 may present a naming element 820 that presents a naming field 820 that allows the user to enter a name for the compute target. In one or more embodiments, the system may check that the entered name is unique to the tenant premises. The entered name can then be used as the addressable identifier. Alternatively, the system may generate a unique addressable identifier for the compute and display the addressable identifier in the naming field without allowing modification.

When the user selects the create control element 806, the system receives the selected tenant managed resources and the compute target entity name as a create request. The selection of tenant managed resources becomes the infrastructure definition. The system then generates the compute target entity.

Figure 9:
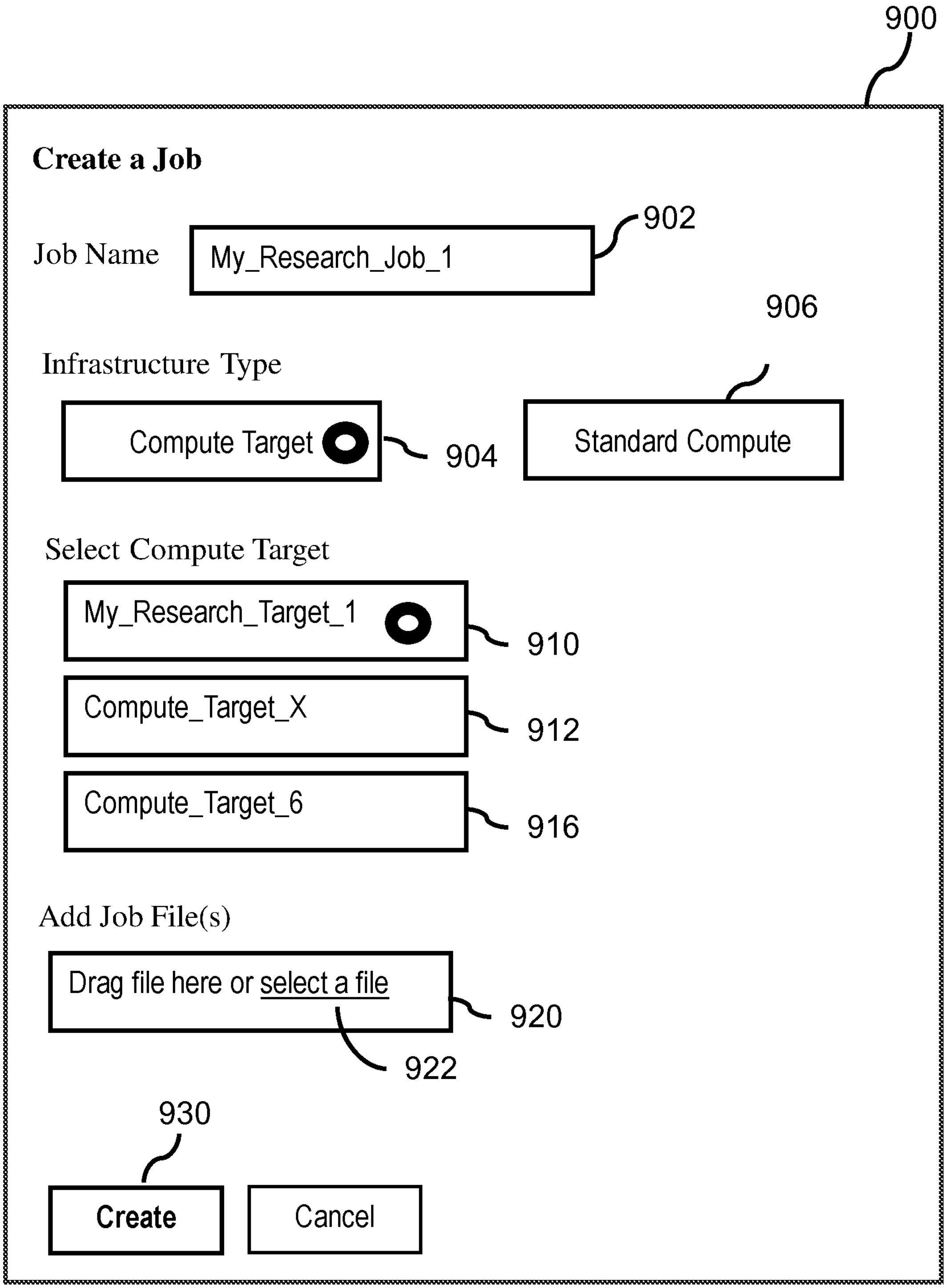
FIG. 9 illustrates an example of a GUI for requesting execution of a set of operations in accordance with one or more embodiments.

FIG. 9 illustrates an example of a GUI 900 for requesting execution of a set of operations, referred to herein as a "job". GUI 900 may provide a naming field 902 to allow the user to enter a name for the job. GUI 900 may provide selectable elements 904 and 906 that allow the user to choose to use either a compute target or a standard compute shape, respectively. In the illustrated example, the user selected the compute target element 904.

GUI 900 may present the available compute target entities responsive to the user selecting element 904. For example, GUI 900 may present one selectable element, e.g., elements 910, 912, and 914, for each possible compute target in the tenant managed infrastructure. Each element may be labeled with the addressable identifier of the corresponding compute target. Alternatively, GUI 900 may present the compute target choices as a drop-down menu.

GUI 900 may include a field 920 to allow the user to provide the set of operations to execute, e.g., as one or more files. Field 920 may allow the user to drag and drop one or more files into the field. Field 920 may include a link 922 that, when selected, allows the user to navigate to the file or files via the computer's fie storage interface.

When the user selects the create control element 930, the system receives the selected compute target entity as well as the set of operations in the form of the one or more files added as a request to perform the set of operations using the selected compute target entity.

6. Practical Applications, Advantages, and Improvements

The one or more embodiments described herein permit customers of cloud service data services to use the data service within the customer's own tenant-managed infrastructure while preventing the data service from accessing any parts of the tenant-managed infrastructure that the tenant does not want to expose. This allows the data service customer to make use of the data service in a secure way on the tenant's available infrastructure, avoiding potential delays in data service execution when the data service's managed infrastructure may not be available.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:

receiving, at a service provider system via a graphical user interface (GUI), a first request to create a target compute entity, wherein the first request comprises an infrastructure definition that defines a set of compute resources (a) for implementing the target compute entity and (b) to be selected from a set of tenant-managed resources implemented on a tenant's premises;

responsive to receiving the first request: generating, by the service provider system, a target compute entity, the target compute entity being associated with an addressable identifier and corresponding to the set of compute resources selected from the set of tenant-managed resources implemented on the tenant's premises;

receiving, by the service provider system, a second request for execution of a set of operations, wherein the second request specifies the addressable identifier associated with the target compute entity for execution of the set of operations, wherein the set of operations comprises one or more operations;

mapping, by the service provider system, the addressable identifier to the target compute entity and selecting the set of compute resources corresponding to the target compute entity for execution of the set of operations; and causing, by the service provider system and using a service provider application, execution of the set of operations on the set of compute resources on the tenant's premises.

2. The one or more non-transitory computer readable media of claim 1, wherein causing execution of the set of operations on the set of compute resources comprises obtaining access to the set of compute resources using a set of credentials associated with the target compute entity.

3. The one or more non-transitory computer readable media of claim 1, wherein causing execution of the set of operations on the set of compute resources comprises requesting execution of the set of operations using an Application Programming Interface (API) associated with the set of tenant-managed resources.

4. The one or more non-transitory computer readable media of claim 1, wherein the first request further specifies a namespace to be accessible to the target compute entity, wherein the set of compute resources, of the set of tenant-managed resources, are limited to the namespace specified by the first request for the target compute entity.

5. The one or more non-transitory computer readable media of claim 1, wherein the operations further comprise assigning the target compute entity a particular role of a plurality of roles, and wherein the set of compute resources, of the set of tenant-managed resources, are limited based on the role assigned to the target compute entity.

6. The one or more non-transitory computer readable media of claim 1, wherein the operations further comprise:

transmitting, by the service provider system to a resource manager associated with the set of tenant-managed resources, a request for a status update regarding the set of one or more operations;

receiving, by the service provider system from the resource manager, the status update regarding the set of one or more operations; and displaying, by the GUI, the status update in association with the compute target-entity.

7. The one or more non-transitory computer readable media of claim 1, wherein the set of compute resources correspond to a subset of a cluster of compute resources comprised in the set of tenant-managed resources.

8. The one or more non-transitory computer readable media of claim 1, wherein the operations further comprise:

receiving, via the graphical user interface, a third request to create a second target compute entity, wherein the third request comprises a second infrastructure definition that defines a second set of compute resources (a) for implementing the second target compute entity and (b) to be selected from a set of service provider-managed resources implemented within service provider system.

9. The one or more non-transitory computer readable media of claim 1, wherein the operations further comprise configuring, by the service provider system, the set of compute resources of the set of tenant-managed resources implemented on the tenant's premises.

10. The one or more non-transitory computer readable media of claim 1, wherein causing execution of the set of operations comprises: executing, by the service provider system, the service provider application to generates commands for performing the set of operations, and transmitting the commands to a resource manager that manages the set of compute resources for a tenant.

11. The one or more non-transitory computer readable media of claim 1, wherein the set of compute resources comprise a set of physical infrastructure resources on the tenant's premises.

12. A method comprising:

receiving, via a graphical user interface, a first request to create a compute target entity, receiving, at a service provider system via a graphical user interface (GUI), a first request to create a target compute entity, wherein the first request comprises an infrastructure definition that defines a set of compute resources (a) for implementing the target compute entity and (b) to be selected from a set of tenant-managed resources implemented on a tenant's premises;

responsive to receiving the first request: generating, by the service provider system, a target compute entity, the target compute entity being associated with an addressable identifier and corresponding to the set of compute resources selected from the set of tenant-managed resources implemented on the tenant's premises;

receiving, by the service provider system, a second request for execution of a set of operations, wherein the second request specifies the addressable identifier associated with the target compute entity for execution of the set of operations, wherein the set of operations comprises one or more operations;

mapping, by the service provider system, the addressable identifier to the target compute entity and selecting the set of compute resources corresponding to the target compute entity for execution of the set of operations; and causing, by the service provider system and using a service provider application, execution of the set of operations on the set of compute resources on the tenant's premises;

wherein the method is performed by at least one device including a hardware processor.

13. The method of claim 12, wherein causing execution of the set of operations on the set of compute resources comprises obtaining access to the set of compute resources using a set of credentials associated with the target compute entity.

14. The method of claim 12, wherein causing execution of the set of operations on the set of compute resources comprises requesting execution of the set of operations using an Application Programming Interface (API) associated with the set of tenant-managed resources.

15. The method of claim 12, further comprising: assigning the target compute entity a particular role of a plurality of roles, and wherein the set of compute resources, of the set of tenant-managed resources, are limited based on the role assigned to the target compute entity.

16. The method of claim 12, further comprising:

transmitting, by the service provider system to a resource manager associated with the set of tenant-managed resources, a request for a status update regarding the set of operations;

receiving, by the service provider system from the resource manager, the status update regarding the set of operations; and displaying, by the GUI, the status update in association with the target compute entity.

17. The method of claim 12, further comprising:

receiving, via the graphical user interface, a third request to create a second compute target entity, wherein the third request comprises a second infrastructure definition that defines a second set of compute resources (a) for implementing the second target compute entity and (b) to be selected from a set of service provider-managed resources implemented within service provider system.

18. The method of claim 12, further comprising: configuring, by the service provider system, the set of compute resources of the set of tenant-managed resources implemented on the tenant's premises.

19. The method of claim 12, wherein causing execution of the set of operations comprises: executing, by the service provider system, the service provider application to generates commands for performing the set of operations, and transmitting the commands to a resource manager that manages the set of compute resources for a tenant.

20. A system comprising:

at least one device including a hardware processor, the system being configured to perform operations comprising:

receiving, at a service provider system via a graphical user interface, a first request to create a target compute entity, wherein the first request comprises an infrastructure definition that defines a set of compute resources (a) for implementing the target compute entity and (b) to be selected from a set of tenant-managed resources implemented on a tenant's premises;

responsive to receiving the first request: generating, by the service provider system, a target compute entity, the target compute entity being associated with an addressable identifier and corresponding to the set of compute resources selected from the set of tenant-managed resources implemented on the tenant's premises;

receiving, by the service provider system, a second request for execution of a set of operations, wherein the second request specifies the addressable identifier associated with the target compute entity for execution of the set of operations, wherein the set of operations comprises one or more operations;

mapping, by the service provider system, the addressable identifier to the target compute entity and selecting the set of compute resources corresponding to the target compute entity for execution of the set of operations; and causing, by the service provider system and using a service provider application, execution of the set of operations on the set of compute resources on the tenant's premises.

21. The one or more non-transitory computer readable media of claim 1, the operations further comprising:

providing the addressable identifier to a tenant computing device by the service provider system, wherein the second request is received from the tenant computing device.

* * * * *